United States Patent [19]

Otsuki et al.

[11] 4,138,377
[45] * Feb. 6, 1979

[54] COATING COMPOSITION AND PROCESS FOR ITS PREPARATION

[75] Inventors: Yutaka Otsuki, Yokohama; Yoshihiko Araki, Kawasaki; Kazuho Aoyama, Tokyo, all of Japan

[73] Assignee: Nippon Oil Company, Ltd., Tokyo, Japan

[*] Notice: The portion of the term of this patent subsequent to Feb. 7, 1995, has been disclaimed.

[21] Appl. No.: 852,050

[22] Filed: Nov. 16, 1977

[30] Foreign Application Priority Data

Nov. 19, 1976 [JP] Japan ................................ 51-138406

[51] Int. Cl.$^2$ ....................... C09D 3/28; C09D 3/733; C09D 5/40
[52] U.S. Cl. ............................... 260/23.7 A; 106/237; 106/238; 106/243; 106/244; 106/252; 204/181 R; 260/24; 260/29.6 MN; 260/29.7 H; 260/29.7 N
[58] Field of Search .................. 260/23.7, 24, 29.6, 260/23.7 R, 23.7 A, 29.6 MN, 29.7 N, 404.5, 29.7 H; 106/252, 244

[56] References Cited

U.S. PATENT DOCUMENTS

| 2,795,564 | 6/1957 | Conn et al. ................. 260/29.6 MM |
| 2,826,556 | 3/1958 | Greenspan et al. ..................... 526/56 |
| 3,468,829 | 9/1969 | Yoshioka et al. ...................... 260/24 |
| 3,546,184 | 12/1970 | Heidel et al. ........................... 526/56 |
| 3,778,418 | 12/1973 | Nakayama ............................. 526/56 |
| 3,846,163 | 11/1974 | Kest ............................. 260/31.8 DR |
| 3,952,023 | 4/1976 | Kaiya et al. ................... 260/346.8 R |
| 4,071,375 | 1/1978 | Ishibe et al. .......................... 106/238 |
| 4,072,536 | 2/1978 | Otsuki et al. .......................... 106/252 |

FOREIGN PATENT DOCUMENTS 51-119727 10/1976 Japan.
1102652 2/1968 United Kingdom.

Primary Examiner—Ronald W. Griffin
Attorney, Agent, or Firm—Wenderoth, Lind & Ponack

[57] ABSTRACT

A paint comprising as a film-forming component a resinous substance obtained by reacting maleinized polybutadiene containing an unsaturated group and having a low degree of polymerization with a diamine compound containing a primary and a secondary amino group. The resinous substance can be readily rendered water-soluble, and is useful as water-base paints, particularly electrodeposition paints that deposit on the cathode. In place of the maleinized polybutadiene, maleinized drying oils or semi-drying oils or maleinized petroleum resins can also be used.

9 Claims, No Drawings

COATING COMPOSITION AND PROCESS FOR ITS PREPARATION

This invention relates to a water-soluble curable coating composition, especially a water-soluble curable coating composition suitable for electrodeposition coating of various objects which act as a cathode, and to a process for its production.

Conventional water-soluble paints, especially electrodeposition paints, are based on resins containing an acid group, for example maleinized oils, maleinized polybutadiene, alkyd resins, or acrylic resins containing acrylic acid or methacrylic acid as a copolymer component, which will be rendered water-soluble by neutralization with bases such as ammonia, amines or potassium hydroxide.

The resins dissociate in water to yield anions, and in electrodeposition, precipitate on an object to be coated which is an anode. Since the metal to be coated becomes an anode in this process, it undergoes oxidation by oxygen generated as a result of electrolysis of water, and partly dissolves in the aqueous solution. A part of the metal that has dissolved remains in the resulting electrodeposited coating to color it. For example, if the object to be coated is made of iron, it changes the color of a white paint to brown; and if it is made of aluminum, it colors the paint yellow. Furthermore, the metal ion remaining in the coating markedly reduces the corrosion resistance of the coating. The paint solution is also contaminated by the dissolved ion, and the stability of the electrodeposition bath is considerably impaired.

The above dissolving and contamination occur similarly when the metal to be coated is treated with a phosphate for rust-proofness. The phosphate coating formed is dissolved and drastically decreases in rust-proofing effect. Furthermore, coatings of a paint of this type do not possess sufficient alkali resistance.

If an object to be coated can be used as a cathode in electrodeposition, the dissolving of the metal from the coated article or the dissolving of its surface coating will not occur, and therefore, a coating having good corrosion resistance will be obtained without the coloration of the coating by the dissolved metal ion. In addition, this electrodeposition process is applicable to metals which because of their tendency to dissolve, cannot be satisfactorily coated by the anode-precipitating electrodeposition method.

In order to perform an electrodeposition method using a coating object as a cathode, it is necessary to use a water-soluble resin which becomes a cationic resin in water and precipitates on the cathode.

Various investigations have been made about the method for producing water-soluble resins that will precipitate on a cathode, and resulted, for example, in modified epoxy resins (Japanese Patent Publications Nos. 23807/74 and 31736/74), and modified acrylic resins obtained by radical-copolymerization of acrylic monomers containing a tertiary amino group such as

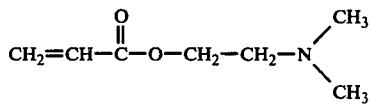

with various acrylic monomers or other monomers (Japanese Patent Publication Nos. 37147/73, 12396/70, 12395/70, and 39351/70).

These conventional electrodeposition paints that will precipitate on a cathode have various defects such as a high curing temperature or a low degree of curing, and have not gained commercial acceptance.

Coatings of water-soluble paints are required to be cross-linked by some means because they are readily soluble in water. Usually, this is accomplished by baking the coating at 150° to 200° C. for about 30 minutes after coating. To meet this requirement, the conventional practice has relied, for example, on a method involving mixing or pre-condensing water-soluble paints with a melamine-formaldehyde resin or a phenol-formaldehyde resin, or a method involving modifying them with drying oils. These methods, however, are not applicable to cathode-precipitating electrodeposition paint resins because they do not contain an acid group and therefore, cannot be cured sufficiently with the melamine-formaldehyde resin or phenol-formaldehyde resin, or because the composition of the coating varies.

For use in electrodeposition, any such water-soluble basic resin that precipitates on a cathode must afford a good coating having superior properties; otherwise, they would be low in pratical value as electrodeposition resins. Furthermore, paints based on such resins must have sufficient stability not only in low concentrations after dilution or in usual paint concentrations before dilution, but also during storage or transportation.

It is an object of this invention therefore to provide a curable water-soluble resin which is free from the defects of the conventional resins described above, has improved curability, and can be readily made water-soluble.

Another object of this invention is to provide a coating composition having high storage stability which can afford a coating having superior resistance to external mechanical forces such as impact or bending, and superior chemical resistance such as resistance to alkali, water or solvent.

We made extensive investigations in an attempt to achieve the above objects, and consequently found that cathode-precipitating resins having superior curability and capable of affording coatings of superior properties can be obtained by reacting resins resulting from the introduction of acidic groups into high-molecular-weight compounds containing unsaturated groups, such as natural drying oils (e.g., linseed oil or tung oil), or a synthetic polymer containing a carbon-carbon double bond and having a low degree of polymerization (e.g., maleinized liquid polybutadiene), with diamines having a primary and a secondary amino group or mixtures of diamines having a primary and a secondary amino group and diamines having a primary and a tertiary amino group.

The above objects can be achieved in accordance with this invention by a coating compound for cathode-precipitating electrodeposition consisting essentially of (1) a curable resinous film-forming component capable of being rendered water-soluble by neutralization with a water-soluble inorganic or organic acid, and (2) an aqueous medium or an organic liquid medium; said component (1) consisting of an unsaturated organic compound having a molecular weight of 300 to 30,000 containing a carbon-carbon double bond in an amount corresponding to an iodine value of 50 to 500, said unsaturated organic compound being selected from the group consisting of (a) a homopolymer of a conjugated diolefin containing 4 to 8 carbon atoms, (b) a copolymer of at least two conjugated diolefins containing 4 to 8 carbon atoms, (c) a copolymer of at least one conjugated diolefin containing 4 to 8 carbon atoms and a vinyl monomer having an ethylenic unsaturation containing 2 to 20 carbon atoms, (d) a natural oil, (e) a natural fat and (f) a petroleum resin produced by cationic polymerization of petroleum cracking fractions containing 4 to 10 carbon atoms with a Friedel-Crafts catalyst, said unsaturated organic compound having bonded thereto, through a carbon-carbon bond, an organic basic group of the following formula in aqueous solution when rendered water-soluble

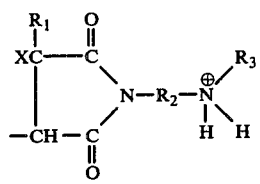

wherein $R_1$ represents a hydrogen atom, a halogen atom or an organic group containing 1 to 3 carbon atoms;

$R_2$ and $R_3$, identical or different, represent an organic group containing 1 to 20 carbon atoms; and X represents a hydrogen atom or a bond, and when X is a bond, the carbon atom to which $R_1$ is attached and the adjacent carbon atom to which hydrogen is attached may both form part of the main chain, or both the organic basic group of formula (I) and an organic basic group of the following formula

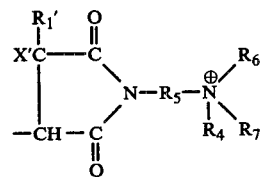

wherein
$R'_1$ represents a hydrogen atom, a halogen atom or an organic group containing 1 to 3 carbon atoms; $R_5$, $R_6$ and $R_7$, identical or different, represent an organic group containing 1 to 20 carbon atoms; $R_4$ represents a hydrogen atom or an organic group containing 1 to 20 carbon atoms;

and X' represents a hydrogen atom or a bond, and when X' is a bond, the carbon atom to which $R'_1$ is attached and the adjacent carbon atom to which hydrogen is attached may both form part of the main chain, the amount of said organic basic group or groups being 0.05 to 0.5 mole per 100 g of the film-forming component (1).

The present inventors previously found that a water-solubilizable polymer obtained by reacting a known anode-precipitating electrodeposition paint resin of the type obtained by introducing an acid group into a skeletal polymer having an unsaturated group, with a diamine having a primary and a tertiary amino group gives a superior cathode-precipitating water-base paint which is free from the defects associated with the conventional water-soluble paints or electrodeposition paints. This discovery was applied for a patent (Japanese Patent Application No. 44802/75).

The water-solubilizable polymer has such a structure that the acid group bonded to the skeletal polymer reacts with the primary amino group of the diamine to form an imide linkage through which the diamine having a terminal tertiary amino group is suspended from the acid group. In rendering this polymer water-soluble, the pH of the solution must be maintained at a somewhat low level, and therefore, there is some likelihood that the polymer may cause the corrosion of the receptable.

The water-solubilizable polymer in accordance with this invention which is obtained by reacting a diamine containing a primary and a secondary amino group with the acid group bonded to a skeletal polymer can be rendered water-soluble at a higher pH, and the likelihood of corrosion can be obviated.

Unexpectedly, it was found in accordance with this invention that the diamine having two groups, primary amino and secondary amino, which are reactive with an acid, reacts smoothly with the polymer containing an acid group to afford a water-solubilizable polymer suitable as a cathode-precipitating electrodeposition paint. According to the conventional knowledge of those skilled in the art, it was expected that if a compound containing two groups reactive with an acid is reacted with a polymer containing an acid group, undesirable reactions such as gellation would take place, and it would be difficult to advance the reaction further. The discovery in accordance with this invention which was contrary to such expectation is indeed surprising.

The resin containing a carbon-carbon double bond and the group of formula (I) or both groups of formula (I) and (II), which constitutes the film-forming component of the coating composition of this invention, is a novel high-molecular-weight compound. This compound can be produced by reacting (A) an unsaturated organic compound having a molecular weight of 300 to 30,000 containing a carbon-carbon double bond in an amount corresponding to an iodine value of 50 to 500, said unsaturated organic compound being selected from the group consisting of (a) a homopolymer of a conjugated diolefin containing 4 to 8 carbon atoms, (b) a copolymer of at least two conjugated diolefins containing 4 to 8 carbon atoms, (c) a copolymer of at least one conjugated diolefin containing 4 to 8 carbon atoms and a vinyl monomer having an ethylenic unsaturation containing 2 to 20 carbon atoms, (d) a natural oil, (e) a natural fat and (f) a petroleum resin produced by cationic polymerization of petroleum cracking fractions containing 4 to 10 carbon atoms with a Friedel-Crafts catalyst, said unsaturated organic compound having bonded thereto, through a carbon-carbon bond, an acidic group of the formula

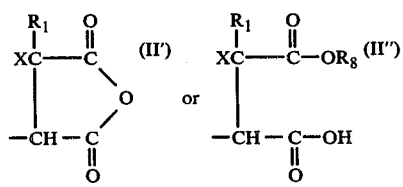

wherein $R_1$ represents a hydrogen atom, a halogen atom, or an organic group containing 1 to 3 carbon atoms; $R_8$ represents a hydrogen atom or an organic group containing 1 to 20 carbon atoms; and X represents a hydrogen atom or a bond, and when X is a bond, the carbon atom to which R₁ is attached and the adjacent carbon atom to which hydrogen is attached may both form part of the main chain;
with (B) a diamine compound of the formula

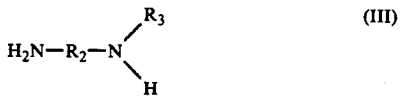
(III)

wherein $R_2$ and $R_3$, identical or different, represent an organic group containing 1 to 20 carbon atoms,
or a mixture of the diamine compound of formula (III) and a diamine compound of the formula

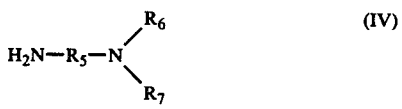
(IV)

wherein $R_5$, $R_6$ and $R_7$ represent an organic group containing 1 to 20 carbon atoms,
at a temperature of 100° to 200° C. to form a resinous substance containing basic groups, adding a water-soluble inorganic or organic acid to the resinous substance to render the resinous substance water-soluble, and if desired mixing the resulting water-soluble resinous substance additionally with an aqueous medium or an organic liquid medium. The above reaction may be carried out in the presence of the liquid medium.

When the diamine compound of formula (III) alone is used, a resin which upon water solubilization can gain the basic group of formula (I) is produced. The use of the mixture of the diamine compounds of formulae (III) and (IV) can lead to the production of a resin which upon water solubilization can gain the basic groups of formulae (I) and (II).

The acid modified resinous substance contains a main chain derived from an unsaturated organic compound or unsaturated group-containing liquid or solid polymer having a number average molecular weight (to be referred to simply as molecular weight) of 300 to 30,000 and containing a carbon-carbon double bond in an amount corresponding to an iodine number of 50 to 500, preferably 100 to 470.

Examples of such an unsaturated organic compound are natural oils and fats such as linseed oil, tung oil, soybean oil or dehydrated castor oil, and stand oils prepared by heat-treating such natural oils and fats to increase their molecular weights. Examples of the unsaturated group-containing liquid or solid polymer are polymers having low degrees of polymerization of conjugated diolefins usually containing 4 to 8 carbon atoms such as butadiene, isoprene or piperylene, copolymers having low degrees of polymerization of two or more of these conjugated dienes, and copolymers having low degrees of polymerization of at least one of these conjugated diolefins and a vinyl monomer having an ethylenic unsaturation usually containing 2 to 20 carbon atoms, especially, aliphatic or aromatic vinyl monomers such as isobutylene, diisobutylene, acrylic or methacrylic acid or the esters thereof, allyl alcohol or its esters, styrene, α-methylstyrene, vinyltoluene, or divinylbenzene. These compounds can be used either alone or as admixtures of two or more.

These polymers with low degrees of polymerization can be produced by known methods. A typical method comprises the anionic polymerization of conjugated diolefins containing 4 or 5 carbon atoms either alone, or as mixtures with each other or with an aromatic vinyl monomer such as styrene, α-methylstyrene, vinyltoluene or divinylbenzene in an amount of not more than 50 mole% at a temperature of 0° to 100° C. in the presence of an alkali metal or organic alkali metal compound as a catalyst. In order to control the molecular weight and obtain a light-colored low polymer with a reduced gel content, it is convenient to employ a chain-transfer polymerization method using an organic alkali metal compound such as benzyl sodium as a catalyst and a compound containing an alkylaryl group such as toluene as a chain-transfer agent (U.S. Pat. No. 3,789,090), a living polymerization method carried out in a tetrahydrofuran solvent using a polynuclear aromatic compound such as naphthalene as an activator and an alkali metal such as sodium as a catalyst (Japanese Patent Publications Nos. 17485/67 and 27432/68), and a method in which an aromatic hydrocarbon such as toluene or xylene is used as a solvent and a dispersion of a metal such as sodium in an organic solvent is used as a catalyst, and the molecular weight of the polymer is controlled by adding an ether such as dioxane (Japanese Patent Publications Nos. 7446/57, 1245/58, and 10188/59). The polymers having a low degree of polymerization can also be produced by coordination anionic polymerization using an acetylacetonate compound of a metal of Group VIII of the periodic table, such as cobalt or nickel, and an alkylaluminum halogenide as catalysts (Japanese Patent Publications Nos. 597/70 and 30300/71).

Furthermore, petroleum resins having an unsaturated group produced by cationic polymerization of petroleum cracking fractions containing 4 to 10 carbon atoms with a Friedel-Crafts catalyst such as aluminum chloride boron trifluoride or a complex of these at 0° to 100° C., and a butadiene/isobutylene copolymer having a low degree of polymerization and prepared by using a similar catalyst, can also be used as the main chain portion of the resins used in the present invention.

The natural oils and fats exemplified above have a molecular weight of 300 to 30,000, preferably 1,000 to 5,000, and the low polymers of conjugated dienes have a molecular weight of 300 to 30,000, preferably 1,000 to 5,000. If the molecular weight is larger than 30,000, these compounds have poor solubility in water, and if it is less than 300, coatings obtained from these compounds have too low a strength to be practical.

The above natural oils and fats and the conjugated diolefin polymers or copolymers having low degrees of polymerization have an iodine value of 50 to 500, preferably 100 to 470. If the iodine value is less than 50, the curability of these compounds is poor, and if it exceeds 500, they have poor storage stability.

The "iodine value," as referred to in the present application, is measured by the following method disclosed in A. Kemp and H. Peters, Ind. Eng. Chem., Anal., Ed. 15, 453 (1943). About 0.1 g of a sample is collected in a flask for iodine value measurement, and 100 ml of chloroform and 100 g of p-dichlorobenzene are added to dissolve the sample. Then, 60 ml of a 0.1N carbon tetrachloride solution of iodine monochloride is added, and reacted with the sample by shaking at room temperature for 1 hour. Then, 10 ml of a 10% aqueous solution of potassium iodide is added, and the mixture is shaken for 5 minutes. The resulting solution is then titrated with a 0.1N aqueous solution of sodium thiosulfate using starch as an indicator.

Introduction of acid groups of the general formula

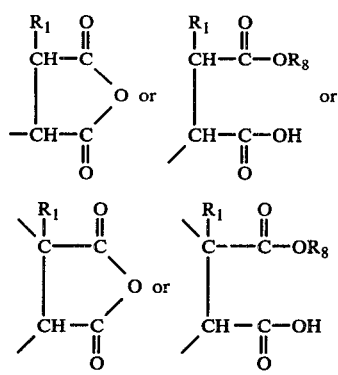

wherein $R_1$ represents a hydrogen atom or an organic group containing 1 to 3 carbon atoms, and $R_8$ represents a hydrogen atom or an organic group containing 1 to 20 carbon atoms,
into the natural oils and fats, petroleum resins or conjugated diolefin polymers or copolymers of low degrees of polymerization can be effected by utilizing a known method which comprises causing the addition of a specified acid or anhydride thereof such as maleic acid, maleic anhydride, citraconic acid or citraconic anhydride (Japanese Patent Publication No. 11195/71). A method for preventing gellation by the presence in the reaction system of phenylenediamines, pyrogallols, naphthols, etc. (German OLS 2,362,534) can be preferably employed in performing this addition reaction. It is also possible to mix at least two of the natural oils and fats, petroleum resins or conjugated diolefin polymers or copolymers of low degrees of polymerization and then introduce the acid group; or to first introduce the acid group into such compounds and then mix at least two of them. However, when the rates of addition of the acid groups differ markedly, it is preferred to introduce the acid groups first into the above components, and then mix these components.

The unsaturated organic compound as component (A) can also be produced by a one-step method. For example, it can be prepared by heat-polymerizing cyclopentadiene or dicyclopentadiene and maleic anhydride at a temperature of 150° to 300° C. (U.S. Pat. No. 2,608,550).

The amount of the acid group of the formula

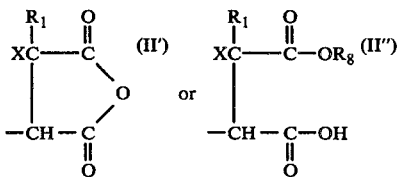

is 0.05 to 0.5 mole, preferably 0.1 to 0.25 mole, per 100 g of the acid-modified resinous substance. If the amount of the acid group is less than 0.05 mole per 100 g of the acid-modified resinous substance, a resin obtained by reacting the unsaturated organic compound (A) with the diamine compound of formula (III) or a mixture of it with the diamine compound (IV) has poor water-solubility when solubilized by neutralization with an acid. If the amount of the acid group is larger than 0.5 mole, the water solubility of the resulting resin is too high. Hence, a coated film of the resin has poor water resistance, and cannot be used for practical purposes.

Examples of the diamine compound of formula (III) having a primary and a secondary amino group include β-hydroxyethylaminoethylamine, β-hydroxyethylaminopropylamine, methylaminoethylamine, ethylaminoethylamine, methylaminopropylamine, ethylaminopropylamine, and butylaminopropylamine. Examples of the diamine compound of formula (IV) containing a primary and a tertiary amino group are dimethylaminoethylamine, diethylaminoethylamine, dimethylaminopropylamine, diethylaminopropylamine and dibutylaminopropylamine.

In the present invention, the unsaturated organic compound (A) is reacted with the diamine compound of formula (III) or both the diamine compounds of formula (III) and (IV). The reaction is an imidization reaction between the acid group and the primary amino group. The total amount of the diamine compound (III) or both (III) and (IV) is preferably equimolar to the acid group of component (A). It is also possible to use the diamine compound in excess, and evaporate it off after the reaction. When the mixture of the diamine compound (III) and the diamine compound (IV) is used, the proportion of the diamine (IV) based on the mixture [(III) + (IV)] is usually up to 90 mole%, preferably 20 to 80 mole%. Usually, in this reaction, the mole ratio of the diamine used in the reaction is approximately equal to the mole ratio of the diamines introduced.

The imidization reaction between the unsaturated organic compound (A) having an acid group and a carbon-carbon double bond and the diamine compound [(III) or a mixture of (III) and (IV)] is carried out at a temperature of 50° to 300° C., preferably 100° to 200° C.

The imidization reaction can be performed in the presence or absence of a solvent. When the viscosity of the unsaturated organic compound (A) to be imidized is low, it is preferred not to use a solvent. Examples of suitable solvents used in the imidization reaction are hydrocarbons such as benzene, toluene, cyclohexane and xylene, alcohols such as butyl Cellosolve, and ethers such as diglyme. Preferably, however, a hydrophilic solvent such as butyl Cellosolve is used and the product is directly water-solubilized.

The resulting curable resinous film-forming material containing a carbon-carbon double bond and a secondary and a tertiary amino group can be conveniently rendered water-soluble by neutralization with 0.2 to 1.0 mole, per mole of the secondary and tertiary amino groups, of an inorganic acid such as hydrochloric acid or sulfuric acid or a water-soluble acid such as formic acid, acetic acid or propionic acid. Alternatively, water solubilization may be performed by treatment with a halogenated hydrocarbon such as methyl chloride, ethyl chloride or butyl chloride to form a quaternary ammonium base.

The coating composition of this invention may be obtained by dissolving or dispersing the resulting resinous material having a carbon-carbon double bond and basic groups as a film-forming component in water or in a water-soluble organic solvent. For example, a water-soluble organic solvent which can dissolve the resinous film-forming component, such as ethyl Cellosolve, propyl Cellosolve, butyl Cellosolve, ethylene glycol dimethyl ether, diethylene glycol dimethyl ether, diacetone alcohol or 4-methoxy-4-methyl-pentanone-2, may be added in an amount of 100 to 10 g per 100 g of the resinous material at the time of water-solubilizing the resinous material in order to facilitate the water solubilization, increase the stability of the aqueous solution, improve the flowability of the resinous material, and to improve the smoothness of the coated film.

The dissolving or dispersing of the resinous material in the aforesaid medium can be effected by conventional mixing procedures for film-forming components and media used in the production of paints, such as by using a stirrer equipped with stirring vanes.

The imidization reaction product between the component (A) and the component (B) may be used as a film-forming component without rendering it water-soluble. In this case, the basic group of formula (I) is expressed as

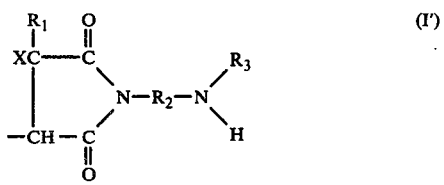
(I')

wherein all symbols are as defined hereinabove, or both the group of formula (I') and a group of the following formula

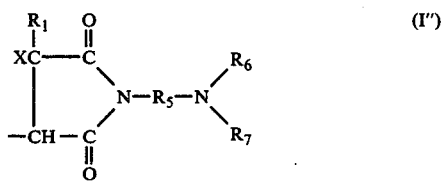
(I")

wherein all symbols are as defined hereinabove.

The coating composition containing the imidization reaction product without water solubilization is preferably a solution in an organic solvent, preferably a hydrocarbon solvent.

The amount of the film-forming component in the coating composition of this invention is not particularly critical. Usually, the composition contains 100 parts by weight of the film-forming components, up to 100 parts by weight of a solvent, up to 300 parts by weight of a pigment and up to 2000 parts by weight of water. When the film-forming component is a water-solubilized product, the amount of water is preferably 50 to 1000 parts by weight in the coating composition.

When the imidization reaction product is used without water solubilization, the coating composition of this invention may contain another known film-forming resin, for example a melamine resin or phenol resin. But when it is used as an electrodeposition paint after having been water-solubilized, it can be used without including the other resin.

Water-base paints prepared by incorporating a suitable pigment such as titania, red iron oxide or carbon black and a rust-proof pigment such as strontium chromate in an aqeous solution obtained by neutralizing the resin having a carbon-carbon double bond and basic groups in accordance with this invention with a water-soluble acid are self-curable. Hence, they are not likely to become nonuniform in composition in an electrodeposition bath as is often the case with the use of a multicomponent resin having heat curability imparted thereto by mixing a curability-imparting component. Furthermore, since these paints can be precipitated on a cathode, the coated films do not undergo coloration, the electrodeposition bath is stable, and the rust proofness of the coated film does not decrease.

The coating composition of this invention may be incorporated with a dryer such as cobalt naphthenate or manganese naphthenate to decrease the baking temperature and shorten the curing time.

The self-curable water-soluble resin in accordance with this invention can be utilized also as water-base paints which can be applied by ordinary methods such as spraying or dipping.

The following Examples and Comparative Examples illustrate the present invention more specifically. The properties of the coated films obtained in these examples were determined in accordance with the methods stipulated in JIS K-5400.

EXAMPLE 1

A 30-liter autoclave was charged with 1 mole of benzyl sodium, 15 moles of toluene and 15 liters of n-hexane under a stream of nitrogen. The temperature was raised to 30° C., and then 10 liters of butadiene was charged into the autoclave at 30° C. over the course of 2 hours. Then, 200 ml of methanol was added to stop the polymerization. Terra alba (1 kg) was added, and the mixture was stirred vigorously. The stirred mixture was then filtered to afford a clear polymer solution free from alkali. The unreacted butadiene, toluene, and n-hexane were evaporated off from the polymer solution to afford polybutadiene (A) having an iodine value of 430, a 1,2-bond content of 65% and a number average molecular weight of 1,000.

A 2-liter autoclave was charged with 1,000 g of polybutadiene (A), 212 g of maleic anhydride, 300 g of xylene and 2 g of Antigen 3C (trademark for a product of Sumitomo Chemical Co., Ltd.), and the reaction was performed at 190° C. for 8 hours under a stream of nitrogen. The unreacted maleic anhydride and xylene were evaporated off under reduced pressure to afford maleinized liquid polybutadiene (A') having an acid value of 100.

The structure of the acid group in the maleinized polybutadiene (A') consisted mainly of

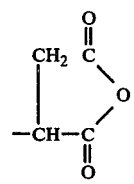

and partly of

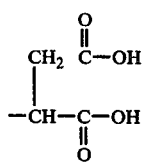

resulting from hydrolysis with water in the air.

A 2-liter separable flask was charged with 1,000 g of maleinized polybutadiene (A'), 200 g of butyl Cellosolve, 91.3 g of dimethylaminopropylamine and 92.9 g of β-hydroxyethylaminoethylamine, and they were heated at 140° C. for 3 hours. Under reduced pressure, the generated water, butyl Cellosolve and unreacted amine were evaporated off to afford imidized polybutadiene (A") having a secondary amino group and a tertiary amino group.

Then, 100 g of the imidized polybutadiene (A") was dissolved in 20 g of butyl Cellosolve which was water soluble. Then, 32 g of titania and 1.3 g of carbon black were incorporated. The resin was neutralized with 5.0 g of acetic acid, and the entire mixture was dissolved in pure water to prepare an aqueous solution having a solids concentration of 12% by weight.

The aqueous solution was placed in a 1-liter beaker, and electrodeposited on a non-treated mild steel panel (a product of Nippon Test Panel Company) as a cathode using a carbon electrode plate as an anode. The results are shown in Table 1.

Comparative Example 1

The maleinized polybutadiene (A') synthesized in Example 1 (100 g) was dissolved in 20 g of butyl Cellosolve. Then, 32 g of titania and 1.3 g of carbon black were incorporated, and the resin was neutralized with an aqueous solution of potassium hydroxide. The entire mixture was then dissolved in pure water to prepare an aqueous solution having a solids concentration of 12% by weight.

The aqueous solution was placed in a 1-liter beaker, and electrodeposited on a non-treated mild steel panel (a product of Nippon Test Panel Company) as a cathode using a carbon electrode plate as an anode. The results are shown in Table 1.

A comparison of Example 1 and Comparative Example 1 shows that the electrodeposition characteristics of the coating compositions and the properties of the coated films differ greatly from each other even when the starting resin is the same, and that the coated film obtained in Example 1 is stronger than in Comparative Example 1 and has a markedly improved alkali resistance although its acid resistence is reduced a little.

Table 1

|  | Example 1 | Comparative Example 1 | Example 2 |
|---|---|---|---|
| Coating conditions | | | |
| Voltage (V) | 50 | 310 | 70 |
| Time (minutes) | 3 | 3 | 3 |
| Baking conditions | | | |
| Temperature (° C.) | 200 | 160 | 200 |
| Time (minutes) | 30 | 30 | 30 |
| Coating thickness (microns) | 20 | 20 | 20 |
| Physical tests | | | |
| Pencil hardness | H - 2H | 2H - 3H | F - H |
| Sketching | Good | Good | Good |
| Crosscut test (tape test) | 100/100 | 90/100 | 100/100 |
| Erichsen (mm) | >9 | 4.5 | >9 |
| Impact strength (cm)(500g, ½B)(*1) | | | |
| Top surface | >50 | 20 | >50 |
| Back surface | >50 | 10 | >50 |
| Flexural resistance (mm)(*2) | <2 | 6 | <2 |
| Chemical tests | | | |
| Alkali resistance (hr)(*3) | >100 | 3.5 | >100 |
| Acid resistance (hr)(*4) | 60 | >100 | 50 |
| Water resistance (days)(*5) | >30 | >30 | >30 |
| Solvent resistance (days)(*6) | >30 | >30 | >30 |
| Corrosion resistance (mm)(*7) | <1 | 8 | 2 |

(*1): The maximum height of a ball fall which does not cause the breakage of the coating in the extruded portion (500 g, ½B).
(*2): The minimum bending radius which causes cracks to the coating.
(*3): The time that elapses until a change, such as blistering, occurs in the coating (when immersed in 5% NaOH).
(*4): The time that elapses until a change, such as blistering, occurs in the coating (when immersed in 5% $H_2SO_4$).
(*5): The time that elaspses until a change, such as blistering, occurs in the coating (when immersed in distilled water at 40° C.).
(*6): The time that elapses until a change, such as blistering, occurs in the coating (when immersed in a 1/1 mixture of toluene and xylene).
(*7): The maximum rust width from a cut portion provided in the coating (a spray of a 5% aqueous solution of NaCl, 50 hours).

EXAMPLE 2

A 20-liter autoclave was charged with 1.0 mole of benzyl sodium, 18 moles of toluene and 15 liters of benzene under a stream of nitrogen. The temperature was raised to 30° C., and then 10 liters of butadiene was fed into the autoclave over the course of 4 hours while maintaining the temperature at 30° C. The catalyst was decomposed with water, and the catalyst residue was removed by washing with water. The toluene, benzene and unreacted butadiene were evaporated off to afford polybutadiene (B) having an iodine value of 410, a 1,2-bond content of 58% and a number average molecular weight of 900.

A 2-liter separable flask was charged with 1,000 g of the polybutadiene (B), 117 g of maleic anhydride, 10 g of xylene and 2 g of Antigen 3C, and they were reacted at 200° C. for 5 hours. The xylene and unreacted maleic anhydride were evaporated off under reduced pressure to afford maleinized polybutadiene (B') having an acid value of 60 and a viscosity of 8000 poises (25° C.).

A 2-liter separable flask equipped with a reflux condenser was charged with 100 g of maleinized polybutadiene (B'), 11.2 g of β-hydroxyethylaminoethylamine and 20 g of butyl Cellosolve, and they were heated at 130° C. for 6 hours to afford polybutadiene (B") having a secondary amino group. The polybutadiene was neutralized with an aqueous solution of acetic acid, and then 80 g of titania was incorporated to produce a water-thinned paint having a solids concentration of 45%.

The water-base paint was applied to a #280 polished mild steel panel by a 5 mil applicator, and baked at 190° C. for 30 minutes.

The coated film had a thickness of 20 microns. The coated film had a pencil hardness of H, but was very pliable and tough as can be understood from its Erichsen value of 6.5 mm and its good result in a Du Pont impact test (50 cm).

The water-base paint had a viscosity of as low as about 80 KU, and thus was found to have superior properties as a water-base baking paint.

Using the resulting imidized polybutadiene (B"), an electrodeposition solution having a solids concentration of 12% was prepared in the same way as in Example 1. An electrodeposition test was performed in the same way as in Example 1 using the resulting electrodeposition solution. The results are shown in Table 1.

EXAMPLE 3

(a) Production of pigment paste

A 2-liter autoclave was charged with 1,000 g of linseed oil having an iodine value of 180 and a molecular weight of about 800, 215 g of maleic anhydride and 50 g of xylene, and the reaction was performed at 190° C. for 8 hours under a stream of nitrogen. Then, the unreacted maleic anhydride and xylene were evaporated off under reduced pressure to afford maleinized linseed oil having an acid value of 100 and a viscosity of 45 poises (25° C.). Then, 700 g of maleinized linseed oil and 130 g of dimethylaminopropylamine were fed into a 2-liter separable flask, and stirred for 1 hour at room temperature. The mixture was heated at 130° C. under reduced pressure for 1 hour to afford linseed oil having an imide group and a tertiary amino group. Four hundred (400) grams of the resulting linseed oil containing an imide group and a tertiary amino group was dissolved in 60 g of diethylene glycol dimethyl ether, and neutralized with 22.5 g of acetic acid to afford an aqueous solution having a solids concentration of 30%. On standing for 3 months, the aqueous solution did not change in viscosity, clarity and pH, showing very good stability.

A 20-liter stainless beaker was charged with 600 g of the 30% aqueous solution prepared, 750 g of titania, 24 g of carbon black, 24 g of strontium chromate and 1000 g of glass beads, and stirred vigorously for 2 hours in a high-speed rotary mixer. The glass beads were removed by filtration to afford a pigment paste (A) having very good water dispersibility.

(b) Production of electrodeposition paint

Polybutadiene (C) having an iodine value of 450, a 1,2-bond content of 65% and a number average molecular weight of 2,000 was synthesized in the same way as in Example 2 except that the amount of toluene was changed to 5 moles. Then, maleinized polybutadiene (C') having an acid value of 100 and a viscosity of 150000 poises was prepared in the same way as in the method of synthesizing maleinized polybutadiene shown in Example 2 except that the amount of maleic anhydride was changed to 212 g.

A 2-liter separable flask equipped with a reflux condenser was charged with 100 g of maleinized polybutadiene (C'), 9.1 g of dimethylaminopropylamine, 9.3 g of β-hydroxyethylaminoethylamine and 20 g of butyl Cellosolve, and the mixture was heated at 150° C. for 3 hours to afford polybutadiene (C") having a secondary amino group and a tertiary amino group. The polybutadiene (C") was dissolved in an aqueous solution of acetic acid to afford an aqueous solution having a solids concentration of 20%. To the aqueous solution was added 63.1 g of the pigment paste (A) prepared in section (a) above, and after good mixing, pure water was added to prepare an electrodeposition paint having a solids concentration of 12%.

The electrodeposition paint was placed in a 1-liter beaker, and electrodeposited on a mild steel panel treated with Bondelite #137 (a product of Nippon Test Panel Co., Ltd.) as a cathode using a carbon electrode plate as an anode. The results are shown in Table 2.

EXAMPLE 4

An electrodeposition paint was prepared in the same way as in Example 3 except that polybutadiene B-1000 (1,2-bond content 90%, number average molecular weight 1000; a product of Nippon Soda Co., Ltd.) was used as the polybutadiene. The results are also shown in Table 2.

EXAMPLE 5

An electrodepositing solution was prepared in the same way as in Example 3 except that Polyoil Huls 110 (polybutadiene having a cis-1,4 content of about 80%, a trans-1,4 bond of about 20% and a number average molecular weight of 1700; a product of Huls Company) was used as the starting material, and the acid value of the maleinized product was changed to 80. Using the resulting electrodepositing solution, electrodeposition on a cathode was carried out in the same way as in Example 3. The results are also shown in Table 2.

Table 2

| Example | 3 | 4 | 5 |
|---|---|---|---|
| Coating conditions | | | |
| Voltage (V) | 150 | 90 | 100 |
| Time (minutes) | 3 | 3 | 3 |
| Baking conditions | 200 × 30 | 200 × 3 | 200 × 30 |
| Coating thickness (microns) | 20 | 20 | 20 |
| Physical tests | | | |
| Pencil hardness | H - 2H | H - 2H | B - HB |
| Sketching | Good | Good | Good |
| Crosscut test (tape test) | 100/100 | 99/100 | 98/100 |
| Erichsen (mm) | >9 | >9 | >9 |
| Impact strength (cm) | | | |
| Top surface | >50 | >50 | >50 |
| Back surface | >50 | >50 | >50 |
| Flexural resistance (mm) | <2 | <2 | <2 |
| Chemical tests | | | |
| Alkali resistance (hr) | >100 | 25 | 10 |
| Acid resistance (hr) | 50 | 30 | 20 |
| Solvent resistance (days) | >30 | >30 | >30 |
| Water resistance (days) | >30 | >30 | >30 |
| Corrosion resistance (mm) | 1 | 3 | 4 |

What we claim is:

1. A coating composition for cathode-precipitating electrodeposition consisting essentially of
   (1) a curable resinous film-forming component capable of being rendered water-soluble by neutralization with a water-soluble inorganic or organic acid, and
   (2) an aqueous medium or an organic liquid medium; said component (1) consisting of an unsaturated organic compound having a molecular weight of 300 to 30,000 containing a carbon-carbon double bond in an amount corresponding to an iodine value of 50 to 500, said unsaturated organic compound being selected from the group consisting of (a) a homopolymer of a conjugated diolefin containing 4 to 8 carbon atoms, (b) a copolymer of at least two conjugated diolefins containing 4 to 8 carbon atoms, (c) a copolymer of at least one conjugated diolefin containing 4 to 8 carbon atoms and a vinyl monomer having an ethylenic unsaturation containing 2 to 20 carbon atoms, (d) a natural oil, (e) a natural fat and (f) a petroleum resin produced by cationic polymerization of petroleum cracking fractions containing 4 to 10 carbon atoms with a Friedel-Crafts catalyst, said unsaturated organic compound having bonded thereto, through a carbon-carbon bond, an organic basis group of the following formula in aqueous solutions when rendered water-soluble

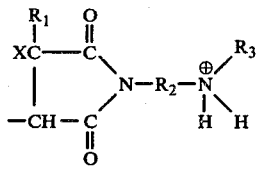

wherein $R_1$ represents a hydrogen atom, a halogen atom or an organic group containing 1 to 3 carbon atoms;

$R_2$ and $R_3$ are identical or different and each represents an organic group containing 1 to 20 carbon atoms; and X represents a hydrogen atom or a bond, and when X is a bond, the carbon atom to which $R_1$ is attached and the adjacent carbon atom to which hydrogen is attached may both form part of the main chain, the amount of said organic basic group being 0.05 to 0.5 mole per 100 g of the film-forming component (1).

2. The composition of claim 1 wherein said organic basic group has been rendered water-soluble.

3. The composition of claim 1 wherein said unsaturated organic compound is an oil selected from the group consisting of linseed oil, tung oil, soybean oil, dehydrated castor oil and stand oil.

4. A process for producing the composition of claim 1, which comprises reacting (A) an unsaturated organic compound having a molecular weight of 300 to 30,000 containing a carbon-carbon double bond in an amount corresponding to an iodine value of 50 to 500, said unsaturated organic compound being selected from the group consisting of (a) a homopolymer of a conjugated diolefin containing 4 to 8 carbon atoms, (b) a copolymer of at least two conjugated diolefins containing 4 to 8 carbon atoms, (c) a copolymer of at least one conjugated diolefin containing 4 to 8 carbon atoms and a vinyl monomer having an ethylenic unsaturation containing 2 to 20 carbon atoms, (d) a natural oil, (e) a natural fat and (f) a petroleum resin produced by cationic polymerization of petroleum cracking fractions containing 4 to 10 carbon atoms with a Friedel-Crafts catalyst, said unsaturated organic compound having bonded thereto, through a carbon-carbon bond, an acidic group of the formula

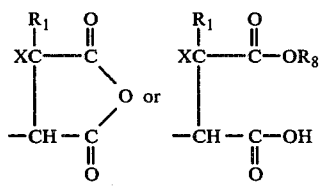

wherein
$R_1$ represents a hydrogen atom, a halogen atom, or an organic group containing 1 to 3 carbon atoms, $R_8$ represents a hydrogen atom or an organic group containing 1 to 20 carbon atoms, and X represents a hydrogen atom or a bond, and when X is a bond, the carbon atom to which $R_1$ is attached and the adjacent carbon atom to which hydrogen is attached may both form part of the main chain, with (B) a diamine compound of the formula

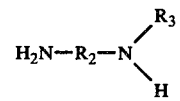

wherein $R_2$ and $R_3$ are identical or different and each represents an organic group containing 1 to 20 carbon atoms, at a temperature of 100° to 200° C. to form a resinous substance containing basic groups, and adding a water-soluble inorganic or organic acid to the resinous substance to render the resinous substance water-soluble.

5. The composition of claim 1 wherein the unsaturated organic compound contains, in addition to the organic basic group, another organic basic group of the formula

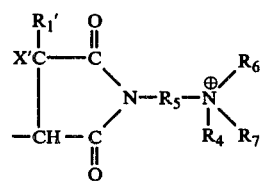

wherein $R_1'$ represents a hydrogen atom, a halogen atom or an organic group containing 1 to 3 carbon atoms; $R_5$, $R_6$ and $R_7$ are identical or different and each represents an organic group containing 1 to 20 carbon atoms; $R_4$ represents a hydrogen atom or an organic group containing 1 to 20 carbon atoms; and X' represents a hydrogen atom or a bond, and when X' is a bond, the carbon atom to which $R_1'$ is attached and the adjacent carbon atom to which hydrogen is attached may both form part of the main chain, the total amount of said organic basic groups being 0.05 to 0.5 mole per 100 g of the film-forming component (1).

6. The process of claim 4 wherein said diamine compound (B) is selected from the group consisting of β-hydroxyethylaminoethylamine, β-hydroxyethylaminopropylamine, methylaminoethylamine, ethylaminoethylamine, methylaminopropylamine, ethylaminopropylamine and butylaminopropylamine.

7. The process of claim 4 wherein the unsaturated organic compound (A) is selected from the group consisting of maleinized linseed oil, maleinized liquid polybutadiene having a low degree of polymerization and maleinized petroleum resin.

8. The process of claim 4 wherein the unsaturated organic compound (A) is reacted with the diamine compound (B) and another diamine compound (C) of the formula

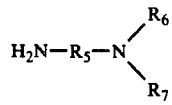
wherein $R_5$, $R_6$ and $R_7$ are identical or different and each represents an organic group containing 1 to 20 carbon atoms.
9. The process of claim 8 wherein the diamine compound (C) is selected from the group consisting of dimethylaminoethylamine, diethylaminoethylamine, dimethylaminopropylamine, diethylaminopropylamine and dibutylaminopropylamine.
* * * * *